United States Patent
Yao

(10) Patent No.: US 10,496,364 B2
(45) Date of Patent: Dec. 3, 2019

(54) SYSTEM AND METHOD FOR CONTROLLING COLORS OF SMART LIGHTS BASED ON USER INTENT USING NATURAL LANGUAGE PROCESSING

(71) Applicant: Baidu USA LLC, Sunnyvale, CA (US)

(72) Inventor: Xuchen Yao, Seattle, WA (US)

(73) Assignee: BAIDU USA LLC, Sunnyvale, CA (US)

( * ) Notice: Subject to any disclaimer, the term of this patent is extended or adjusted under 35 U.S.C. 154(b) by 60 days.

(21) Appl. No.: 15/799,886

(22) Filed: Oct. 31, 2017

(65) Prior Publication Data

US 2019/0129688 A1    May 2, 2019

(51) Int. Cl.
| | |
|---|---|
| G06F 3/16 | (2006.01) |
| H05B 33/08 | (2006.01) |
| G10L 15/22 | (2006.01) |
| G06F 17/27 | (2006.01) |
| G10L 15/08 | (2006.01) |

(52) U.S. Cl.
CPC .......... *G06F 3/167* (2013.01); *G06F 17/2765* (2013.01); *G10L 15/08* (2013.01); *G10L 15/22* (2013.01); *H05B 33/0857* (2013.01); *G10L 2015/088* (2013.01); *G10L 2015/223* (2013.01)

(58) Field of Classification Search
CPC ......... G10L 15/00; G10L 15/22; G10L 15/26; G06F 17/2765; G06F 3/167; H05B 33/0842
See application file for complete search history.

(56) References Cited

U.S. PATENT DOCUMENTS

| | | | | | |
|---|---|---|---|---|---|
| 7,031,920 | B2* | 4/2006 | Dowling | ............ | H05B 37/0236 704/270 |
| 9,642,221 | B2* | 5/2017 | Schlangen | ......... | H05B 37/0236 |
| 2011/0204778 | A1* | 8/2011 | Sadwick | ............ | H05B 33/0827 315/34 |
| 2014/0046935 | A1* | 2/2014 | Bengio | ................. | G06F 16/338 707/723 |
| 2014/0062297 | A1* | 3/2014 | Bora | ................... | H05B 33/0863 315/34 |
| 2014/0163976 | A1* | 6/2014 | Park | ........................ | G10L 15/00 704/231 |
| 2014/0376747 | A1* | 12/2014 | Mullet | ................... | G08C 23/00 381/110 |
| 2016/0227633 | A1* | 8/2016 | Sun | ..................... | H05B 33/0842 |
| 2016/0323969 | A1* | 11/2016 | Aliakseyeu | ............ | A63H 33/42 |
| 2017/0311416 | A1* | 10/2017 | Fu | ............................ | G06F 3/147 |
| 2019/0049818 | A1* | 2/2019 | Cremer | ..................... | G02F 1/25 |

* cited by examiner

*Primary Examiner* — Paras D Shah
(74) *Attorney, Agent, or Firm* — Womble Bond Dickinson (US) LLP

(57) ABSTRACT

According to one embodiment, in response to a text stream originated from a user at an electronic device (e.g., home device), a natural language processing (NLP) operation is performed on the text stream. An object described by the text stream is determined based on the NLP operation. One or more colors associated with the object are determined. A light control command is then transmitted from the electronic device to each of the smart lights to control a color of the smart light based on the one or more colors associated with the object, such that the smart lights are lit with the colors associated with the object. The text stream may be converted from a voice stream using a speech recognition process.

19 Claims, 8 Drawing Sheets

400

| Subject Matter | Colors |
|---|---|
| USA Flag | Blue, Red, White |
| Seattle Seahawks | Navy, Green, Grey |
| Garfield | Orange |
| ... 401 | ... 402 |

FIG. 4

| Phrase/Action | Light Emitting Pattern |
|---|---|
| Night night | Blink 3 times, then off |
| Show me a heart beat | Red repeating pulses of on and off |
| ... 501 | ... 502 |

FIG. 5

SYSTEM AND METHOD FOR CONTROLLING COLORS OF SMART LIGHTS BASED ON USER INTENT USING NATURAL LANGUAGE PROCESSING

TECHNICAL FIELD

Embodiments of the invention relate generally to home devices. More particularly, embodiments of the invention relate to controlling smart lights based on human intents.

BACKGROUND

Traditional ways of controlling smart lights are through smart phone companion mobile applications. These mobile applications provide basic functions of changing the brightness of smart lights. However, sometimes it is very cumbersome to use an application for very basic operations. For instance, take a simple task of switching off the light. On a smart system, this usually involves the following steps: user locates cellphone; user turns on the screen of cellphone; optionally, user unlocks cellphone; user locates and opens the smart light application; and user toggles the light off The entire process usually takes 5 to 10 seconds, much longer than a traditional way of just using a physical light switch. Some proposed conventional solutions offer limited voice controlled capabilities to light bulbs to speed up the process of controlling the lights. For instance, Apple's HomeKit and Amazon Echo both provide simple verbal commands, such as "turn off kitchen lights." However, these simple commands only change a binary state: either turning the lights on or off. This limits users from many desirable and creative ways of using their lights.

BRIEF DESCRIPTION OF THE DRAWINGS

Embodiments of the invention are illustrated by way of example and not limitation in the figures of the accompanying drawings in which like references indicate similar elements.

FIG. 4 is a block diagram illustrating an example of a color database according to one embodiment.

FIG. 5 is a block diagram illustrating an example of a light emitting pattern database according to one embodiment.

DETAILED DESCRIPTION

Figure 1:
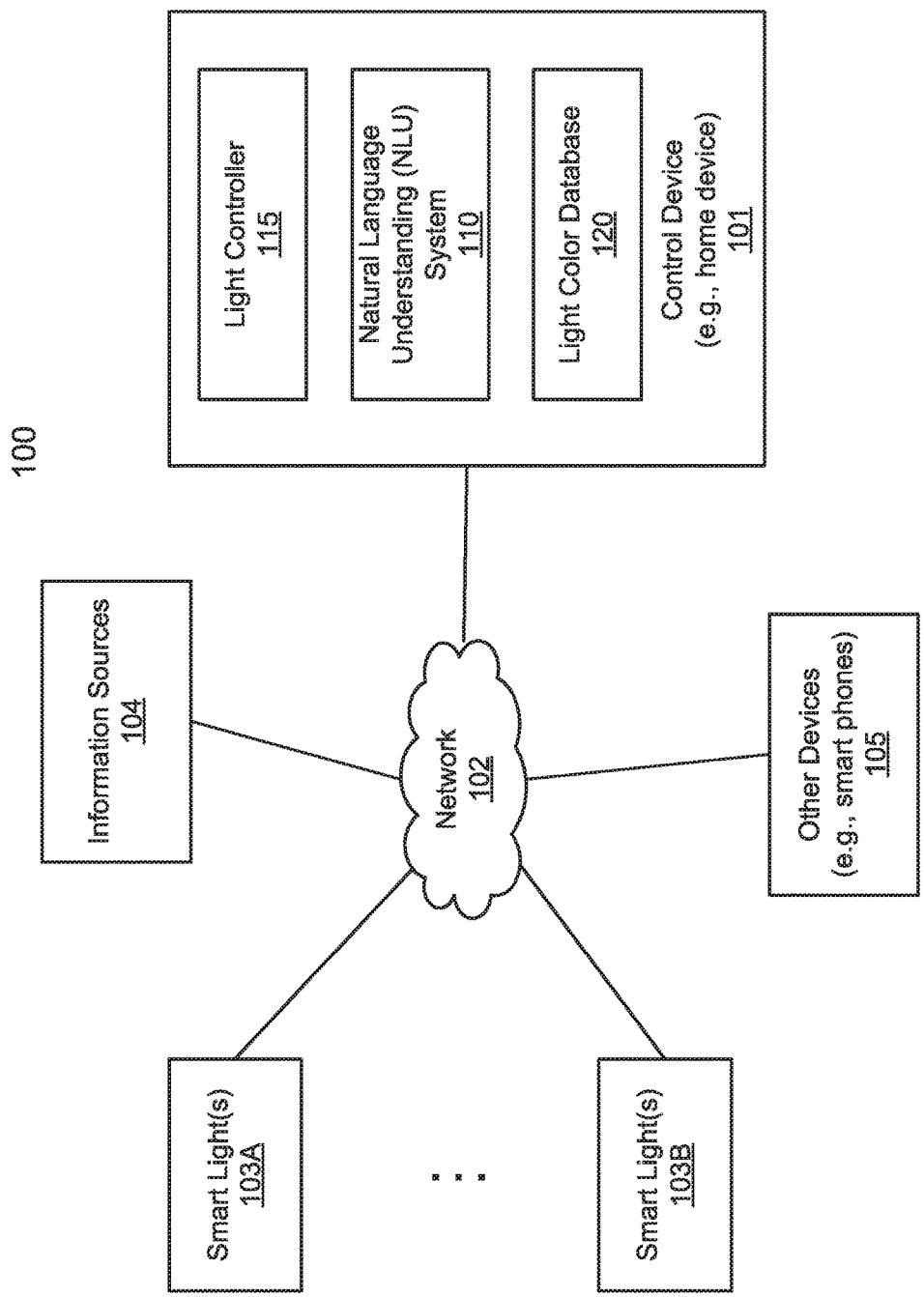
FIG. 1 is a block diagram illustrating a network configuration according to one embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a natural language understanding (NLU) system is utilized to better understand human intent and to control a device, such as a smart light. The system detects objects of interest from natural language utterances from a user, retrieves major colors of these objects of interest, and then projects them onto the user's smart lights. The system has world knowledge of major colors of common physical and abstract objects. In this way it enables users with creative ways of interacting with their smart lights, using either voice or text.

The system is capable of understanding the natural language intent of a user's spoken words, sentences, or phrases, and in response is capable of controlling aspects of a "smart" light, such as by changing the lights accordingly. It has world knowledge of common colors for general objects, themes, and even emotions. It also has capabilities of learning customized commands from users. As such, people can benefit from this in various ways. For instance, the embodiments of the invention can be used for educational purposes to teach children about colors in a natural speaking way. The embodiments of the invention can be used to for recreational purposes to decorate a home, a workspace, a restaurant, or a stage. The embodiments of the invention can be used for communication purposes by using color codes to deliver messages. The system is capable of self-learning and thus is only limited to people's imaginary way of using it.

According to one embodiment, in response to a text stream originated from a user at an electronic device (e.g., home device, or other Internet of things or IoT devices), a natural language processing (NLP) operation is performed on the text stream. An object or entity described by the text stream is determined based on the NLP operation. One or more colors associated with the object are determined. A light control command is then transmitted from the electronic device to each of the smart lights to control the color of the smart light based on the one or more colors associated with the object, such that the smart lights are lit with the colors associated with the object. The text stream may be converted from a voice stream using a speech recognition process.

In one embodiment, in determining the colors associated with the object, a subject matter of the object is determined. A search is performed in a subject matter to color (subject matter/color) mapping data structure based on the subject matter of the object to locate a mapping entry matching the subject matter. One or more colors are then obtained from the matching entry. The subject matter/color mapping table contains a number of mapping entries and each mapping entry maps a particular subject matter to one or more colors. If the color of the object cannot be determined, a query is transmitted to an external source to identify the color of the object. In one embodiment, an image search request is transmitted to an image search engine to search an image of the object. In response to the image of the object, an image processing operation is performed to recognize the color or colors of the image. The recognized color or colors are then used to configure the smart lights.

In addition, a light emitting pattern is also determined based on an NLP operation of the text stream. The light control command further includes information indicating the light emitting pattern, such that the smart lights emit according to the light emitting pattern (e.g., blinking three times). In determining the light emitting pattern, a search is performed in a phrase-to-pattern (phrase/pattern) mapping table based on a phrase obtained from the text stream to obtain a light emitting pattern. The obtained light emitting pattern is then utilized to configure the smart lights. The phrase/pattern mapping table contains a number of mapping entries and each mapping entry maps a particular phrase to a light emitting pattern.

FIG. 1 is a block diagram illustrating a network configuration according to one embodiment. Referring to FIG. 1, network configuration 100 includes a control device 101 communicatively coupled to a variety of devices such as devices 103-105 over a network 102, including smart lights 103A-103B (collectively referred to as smart lights 103), one or more information sources 104, and other devices 105 (e.g., mobile devices). Control device 101 can be a home device or IoT device such as a Google Home device, Amazon Echo device. Control device 101 can also be any mobile device with a mobile application running therein (e.g., Apple Ski, Microsoft Cortana) to control smart lights 103. Information sources 104 can be any server or servers that can provide information or perform a particular process. For example, information source 104 can be an image search facility having an image search engine to search an image of a particular object. Network 102 can be any type of networks such as a local area network (LAN), a wide area network (WAN), a mobile network such as the Internet, or a combination thereof, wired or wireless.

In one embodiment, control device 101 includes an NLU system 110, a smart light controller 115 (or simply referred to as a light controller), and a light color database 120. In response to a text stream representing a sentence or phrase spoken by a user, NLU system 110 is configured to perform an NLP operation on the text stream to determine an object or subject matter described by the text stream. The text stream may be generated from a voice command issued by the user using a speech recognition process. Based on the object or the subject matter, one or more colors associated with the object or the subject matter are identified from color database 120. Light controller 115 is configured to transmit a light control command to each of smart lights 103 to configure each smart light to emit light with the identified color or colors. In addition, NLU system 110 may further determine a light emitting pattern based on the NLP operation on the text stream. Light controller 115 is then configured to transmit the light control command, via a network command output such as network command output 208 of FIG. 2, to configure smart lights 103 to emit according to the light emitting pattern. Note that although light controller 115, NLU system 110 and light color database 120 are shown as a part of control device 101, they can be located in the cloud and are communicatively coupled to control device 101. For example, control device 101 can be a mobile phone device, while light controller 115, NLU system 110, and light color database 120 may be network appliance or IoT devices on the cloud that are communicatively coupled to control device 101.

Figure 2:
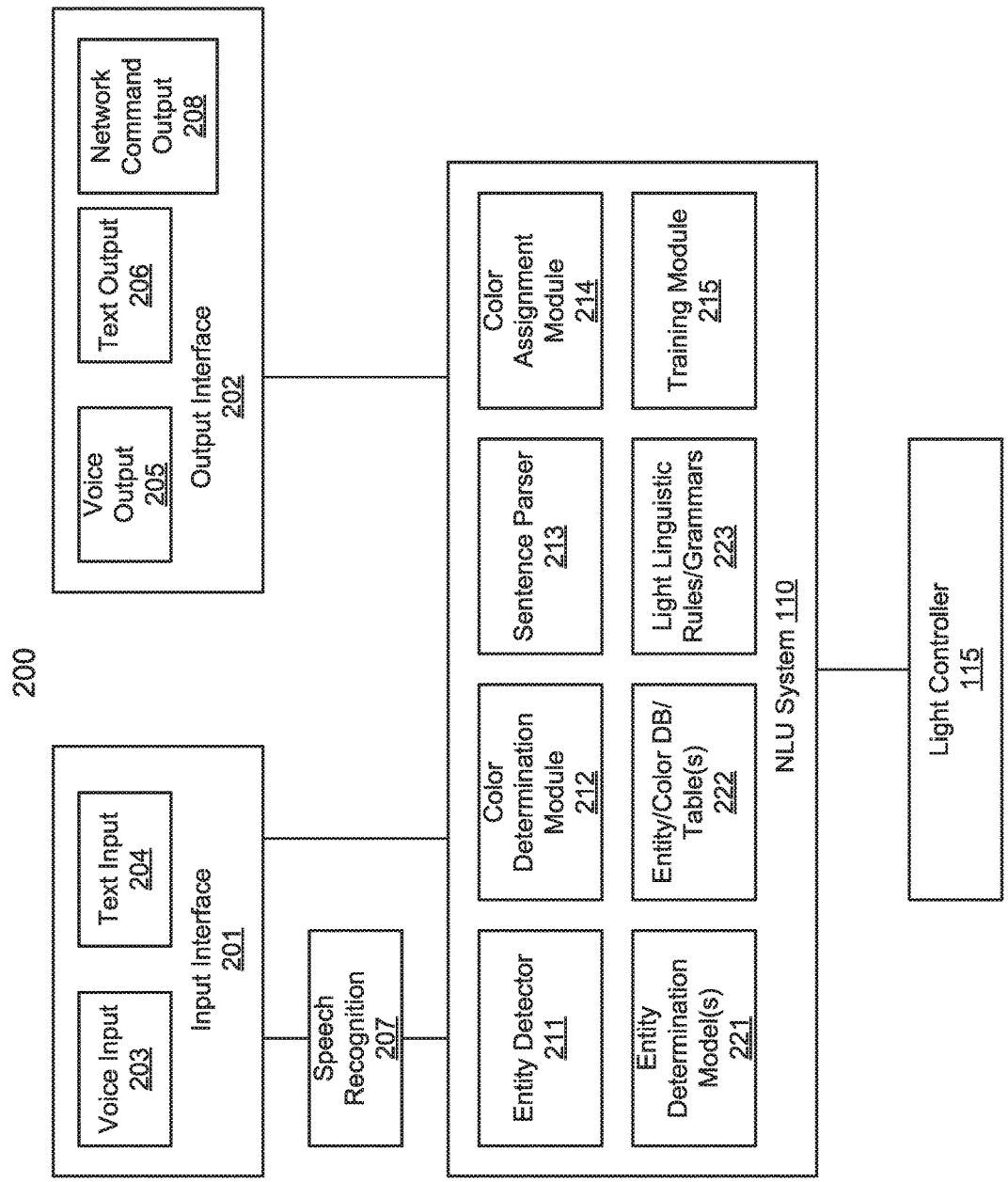
FIG. 2 is a block diagram illustrating an example of an NLU system according to one embodiment.
Figure 3:
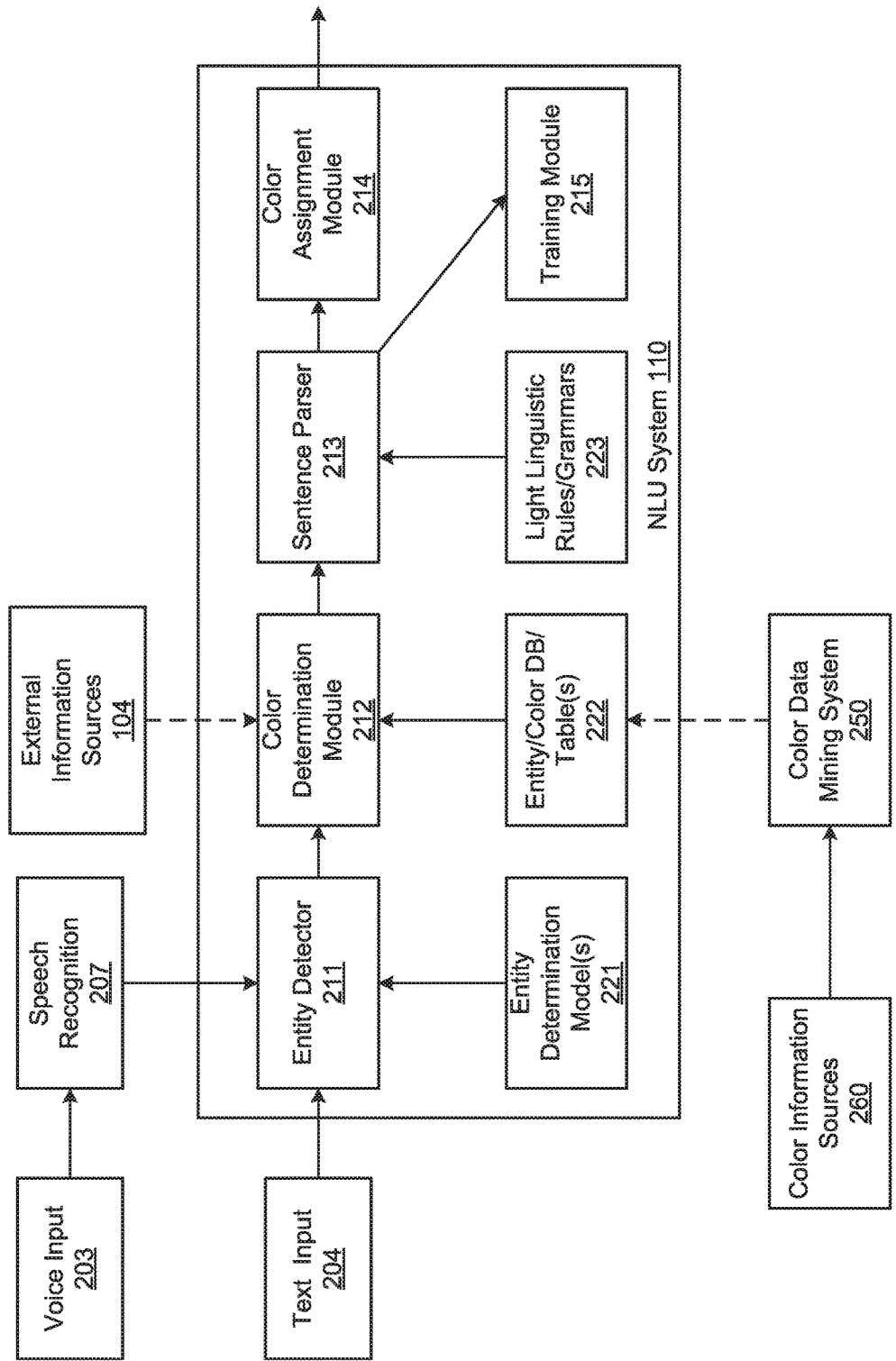
FIG. 3 is a processing flow diagram illustrating a processing flow of an NLU system according to one embodiment.

FIG. 2 is a block diagram illustrating an example of an NLU system according to one embodiment. FIG. 3 is a processing flow diagram illustrating a processing flow of an NLU system according to one embodiment. System 200 may represent control device 101 of FIG. 1. Referring to FIGS. 2 and 3, system 200 includes, but is not limited to, NLU system 110 coupled to an input interface 201 and an output interface 202, and light controller 115, which may be implemented in software, hardware, or a combination thereof. For example, at least some of the components of NLU system 110 may be loaded into a memory (e.g., random access memory or RAM such as dynamic RAM or DRAM) and executed by one or more processors (e.g., microprocessors such as central processing units or CPUs, or general-purpose processing units or GPUs) of system 200 (not shown).

In one embodiment, input interface 201 includes a voice or audio input 203 and text input 204. Voice input 203 may be a part of a microphone. Voice input 203 may also contain a recorded audio stream received from a user. Text input 204 may receive text from an input and output (TO) interface of system 200 such as a keyboard. Text input 204 can be coupled to any communication interface that is capable of receiving texts, such as, for example, an application programming interface (API) to emails, chat, short messaging service (SMS), social media, etc. Input interface 201 may further include or communicate with a speech recognition module 207 to perform a speech recognition of an audio stream received via voice input 203, such as, performing a speech-to-text conversion to transcribe a voice stream into a text stream. Similarly, output interface 202 includes voice output 205 and visual output 206. Voice output 205 may include or be coupled to a speaker. Visual output 206 may include or be coupled to a display that can display information. Visual output 206 may be coupled to any communication mechanism that can transmit visual information (e.g., text, images) to another device to be viewed by a user (e.g., email, chat, SMS, social media).

According to one embodiment, NLU system 110 includes, but is not limited to, entity detector 211, color determination module 212, sentence parse 213, light assignment module 214, and training module 215. These modules 211-215 can also be integrated into fewer modules and may be implemented in software, hardware, or a combination thereof. In response to a text stream received from input interface 201, entity detector 211 is configured to perform an analysis on the text stream to determine or detect an entity or object described by the text stream. The text stream may contain a sentence or phrase provided by a user, either in a verbal format or text format. In one embodiment, entity detector 211 may perform an NLP operation on the text stream to determine an entity or object described by the text stream.

Natural language processing is a field of computer science, artificial intelligence and computational linguistics concerned with the interactions between computers and human (natural) languages, and, in particular, concerned with programming computers to fruitfully process large natural language corpora. Challenges in natural language processing frequently involve natural language understanding, natural language generation (frequently from formal, machine-readable logical forms), connecting language and machine perception, dialog systems, or some combination thereof.

In one embodiment, entity detector 211 detects an entity or object using an entity determination model 221 by extracting all target entities from input text. Entity determination model 221 may be a machine-learning predictive model that has been trained based on a large set of known entities and input phrases or sentences. These entities may include physical objects (e.g., space, deep sea, zebra), abstract entities (e.g., Christmas, St. Patrick's Day, Garfield), and emotions and mood (e.g., sad, happy, desire). For example, when a user says "give me the colors of a USA flag," entity detector 211 may detect the entity of "USA flag" based on the NLP operation. In another example, when the user says "give me some chocolate strawberry, and mango colors," entity detector 211 is able to detect the entities of "chocolate," "strawberry," and "mango."

Based on an entity determined or detected by entity detector 211, color determination module 212 is configured to determine a major color or colors that are associated with the entity. The term of "major color" refers to the color a majority of people would agree for a specific entity or specific object. For example, the color of Garfield is primarily orange; the colors of the USA flag are blue, read, and white; an avocado consists of different layers of green; and the color of chocolate is chocolate (as a color). For example, when a user says "Go Seahawks," entity detector 211 is able to detect that is related to the entity of "Seattle Seahawks" as a football team. Color determination module 212 can determine that entity "Seattle Seahawks" is related the colors of navy, green, and grey.

In one embodiment, color determination module 212 determines a subject matter of the entity or object. A subject matter may represent a type of entities, or simply the name of an entity. Color determination module 212 then performs a lookup operation in color database 222 based on the subject matter to determine the color or colors associated with the subject matter. Color database 222 stores color information for a variety of subject matters. The color database 222 may be implemented in a variety of data structures or formats, such as, for example, lookup tables. In a particular embodiment, color database 222 is implemented as a subject matter/color mapping table, for example, as shown in FIG. 4. Referring to FIG. 4, the subject matter/color mapping table 400 includes a number of mapping entries. Each mapping entry maps a particular subject matter 401 to one or more colors 402. Color determination module 212 searches based on a particular subject matter to locate a mapping entry having subject matter 401 that matches that particular subject matter. One or more colors 402 are then obtained from the matching entry.

Referring back to FIGS. 2 and 3, if the color of the entity in question cannot be determined from color database 222, color determination module 212 may access other information sources 104 to determine the color for the entity. For example, color determination module 212 may send a request to an external server to request external help to determine the color of a certain subject matter or entity. For example, if the color of a particular entity or object cannot be determined, color determination module 212 may transmit a request having the name or type of the entity to a predetermined search engine to search the color for that particular entity.

Alternatively, color determination module 212 may transmit a search request to an image search engine to search an image of the entity in question. In response to an image of the entity received in return, color determination module 212 may perform or invoke an image analysis module to perform an image analysis to determine the color of the entity shown in the image. Furthermore, color determination module 212 may access a dictionary server, Wikipedia, or other Web pages to determine the color based on a definition of the entity. Color database 222 can then be updated based on the determined color of the entity, for example, by adding a new mapping entry in subject matter/color mapping table 400.

Once the color(s) of the entity has been determined, color determination module 212 then tags the obtained color or colors with the input. Then the tagged input is sent to the sentence parser 213 for further detailed analysis. The sentence parser 213 utilizes a linguistic grammars or rules 223 specifically for the light domain. This light grammars 223 may be hand coded or statistically learned. It encodes the structure of expected input. It may also encode grammar modules for other common language intentions, such as times (e.g., blink twice, three times, or one hundred fifty one times), duration (e.g., keep lights on for three minutes), and time (e.g., turn off lights ten minutes after 11).

For example, a user may say "when I say night night, blink all lights three times and then turn off." Sentence parser 213 or a configuration module of the system (not shown) recognizes the light emitting pattern of blinking three times in response to the phrase of "night night." The mapping configuration between the phrase of "night night" and the light emitting pattern or light emitting behavior of blinking 3 times may be maintained as a part of light linguistic rules 223. Light linguistic rules 223 may be implemented as a phrase-to-pattern (phrase/pattern) mapping table as shown in FIG. 5. Referring to FIG. 5, phrase/pattern table 500 includes a number of mapping entries. Each mapping entry maps a particular phrase 501 to a light emitting pattern 502.

Referring back to FIGS. 2 and 3, subsequently, when the user says "night night," sentence parser 213 looks up in the light linguistic rules based on the phrase of "night night" to obtain a corresponding light emitting pattern. For example, when the phrase of "night night" is detected, sentence parser 213 looks up in phrase/pattern mapping table 500 based on the phrase of "night night" to locate a mapping entry that matches the phrase of "night night." The light emitting pattern is then obtained from the matching entry.

According to one embodiment, NLU system 110 may also communicate with other components or systems to determine the light emitting patterns. For example, when a user says "slowly blink lights to mimic my heartbeats," sentence parser 213 may communicate with a heartbeat monitor such as a smart watch via an API to obtain the heartbeat rate of the user. The smart lights are then configured to blink according to the heartbeat rate of the user.

Once the light emitting pattern has been determined, referring back to FIGS. 2 and 3, the information is sent to light assignment module 214. Based on the color and light emitting pattern information, light assignment module 214 generates light configuration information, for example, to evenly distribute light properties to each of the smart lights. For instance, if the user wants three colors on one light, the smart light may be configured to show the three colors one by one with a certain duration for each. If the user wants three colors on four lights, two of the lights may show the same color.

Also, the light configuration information is sent to training module 215 to identify whether it encodes specific key phrases a user wants the light system to learn. For instance, a user may want to define a specific phrase for a specific task; or a user wants to correct previous behaviors. For example, a user noticed the system did not understand what the color of her cat is, then the user can teach the system to remember it. Training module 215 may include or invoke a machine learning engine to "learn" the user specific intents and update entity determination models 221, color database 222, and/or linguistic rules 223 accordingly.

After NLU system 110 interprets the input text, light controller 115 is invoked to generate and send light control commands to smart lights based on light configuration information provided by light color assignment module 214. Meanwhile, the system may optionally provide feedback such as voice feedback and/or visual feedback to the user via output interface 202. The feedback includes enough details to notify the user with what the system has understood, and options to cancel/modify the actions should the user desires.

Note that the order of the processing diagram as shown in FIG. 3 is shown for illustration purpose only. The components may operate in parallel or for some components in revered order. For instance, color determination module 212 can operate in parallel with sentence parser 213, or be delayed until after sentence parsing.

As described above, the success rate of configuring the smart lights properly based on the user intents significantly depends on the operations of color determination module 212 and the color information available in color database 222. Color database 222 may be configured by color data mining system 250 by analyzing and mining color information from a variety of color data sources 260, for example, as shown in FIG. 6, which may be performed offline.

Figure 6:
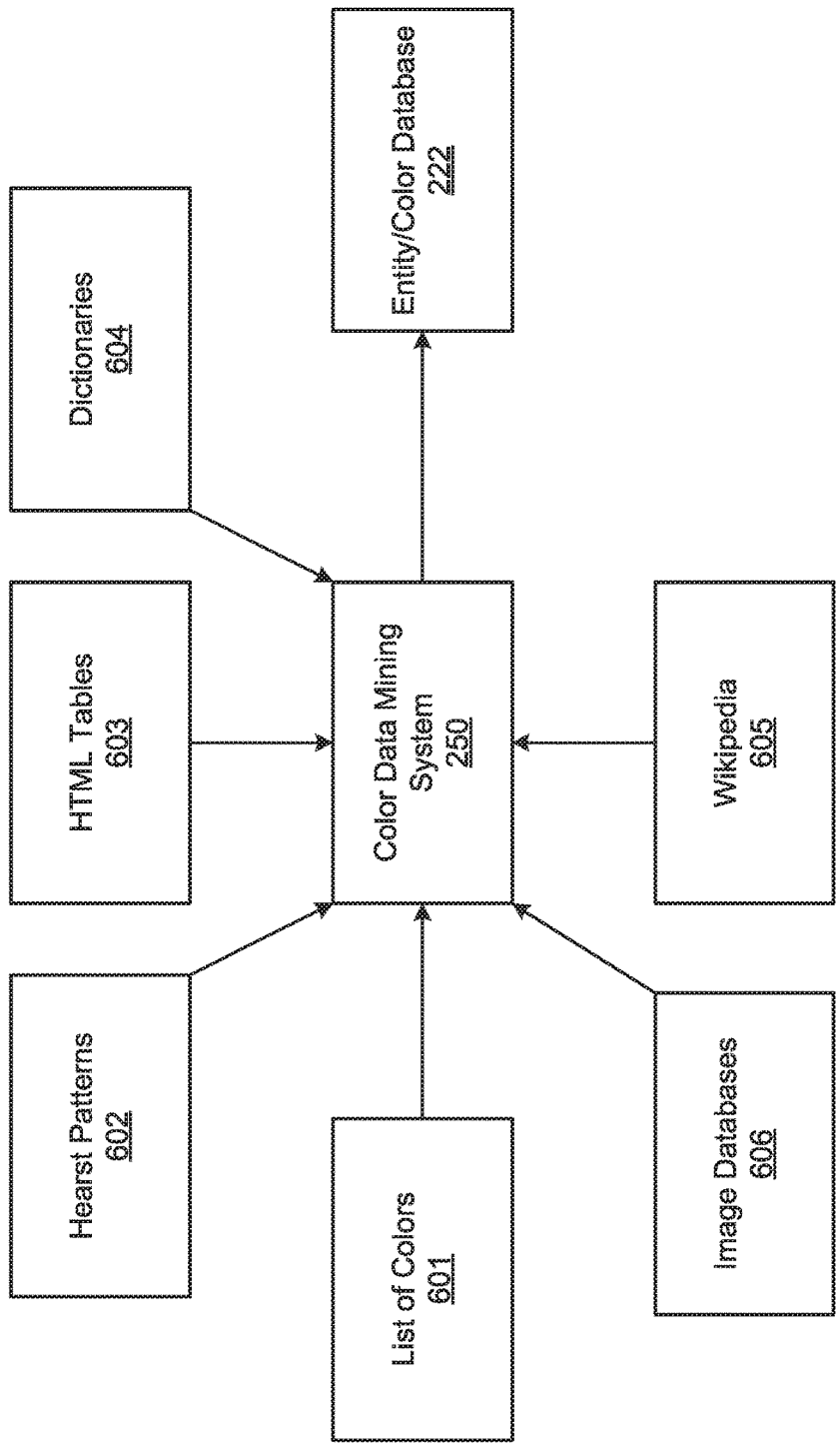
FIG. 6 is a diagram illustrating a color data mining process according to one embodiment.

Referring to FIG. 6, color data mining system 250 may obtain a list of colors 601 from various resources, such as list of colors in hypertext markup language (HTML) code or Cascading Style Sheets. The objects' colors can be extracted using a variety of resources such as Hearst patterns 602, HTML tables 603, dictionaries 604, Wikipedia 605, and image databases 606. Hearst Patterns 602 include statements such as "the color of <. . . > is [color]" where [color] is defined in the list of colors 601. Then the entities in <. . . > can be extracted, ranked, and selected with pruning. Hearst patterns 602 are usually applied on a large text corpus, such as the Web. HTML tables 603 can contain structured list of common objects' colors.

Color data mining system 250 may start by identifying which tables have dedicated columns of colors, then identify the columns listing object names. Dictionaries 604 may define or mention an object's color if it is common. For instance, dictionaries 604 usually indicate that bananas have yellow skins when ripe. Wikipedia 605 may contain many more phrasal definitions not commonly found in dictionaries 604. For instance, when Wikipedia 605 describes a USA flag, the description may mention its color as a combination of blue, read, and white. Image databases 606 may contain a large collection of images for a lot of common objects, such as frogs, sky, horses, lawn, etc. Color extraction algorithms might be applied on these databases to extract the dominating colors.

Note that above-mentioned methods might not have perfect accuracy on extracted object colors. Thus ranking and pruning may be applied. For instance, objects' colors can be cross-validated from various resources. The best scenario is that all resources agree on colors for objects. If disagreement happens, a ranking mechanism can be applied. Alternatively, a color agreed upon by a majority of the information sources will be selected as the final color for the corresponding entity. In this way one may also fit a statistical classifier to learn which evidence is trustworthy. Once a list of common objects' color is validated, they can be used to improve and calibrate the dominant color extraction algorithm used in extracting colors, for example, from image databases 606. As such, in the future, when an object is not presented in the final extraction, the image color extraction algorithm can more accurately identify an object's color.

With the rise of colored smart lights and voice control devices, the techniques described above can be utilized in a variety of new ways. For example, when a user says "show my son what color the Garfield cat is," the system can detect the entity of "Garfield" and configure the smart lights to show in orange color. When a user says "decorate my room like it's Christmas," the system can configure the smart lights in the room to show a combination of red and green, as well as other warm colors.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
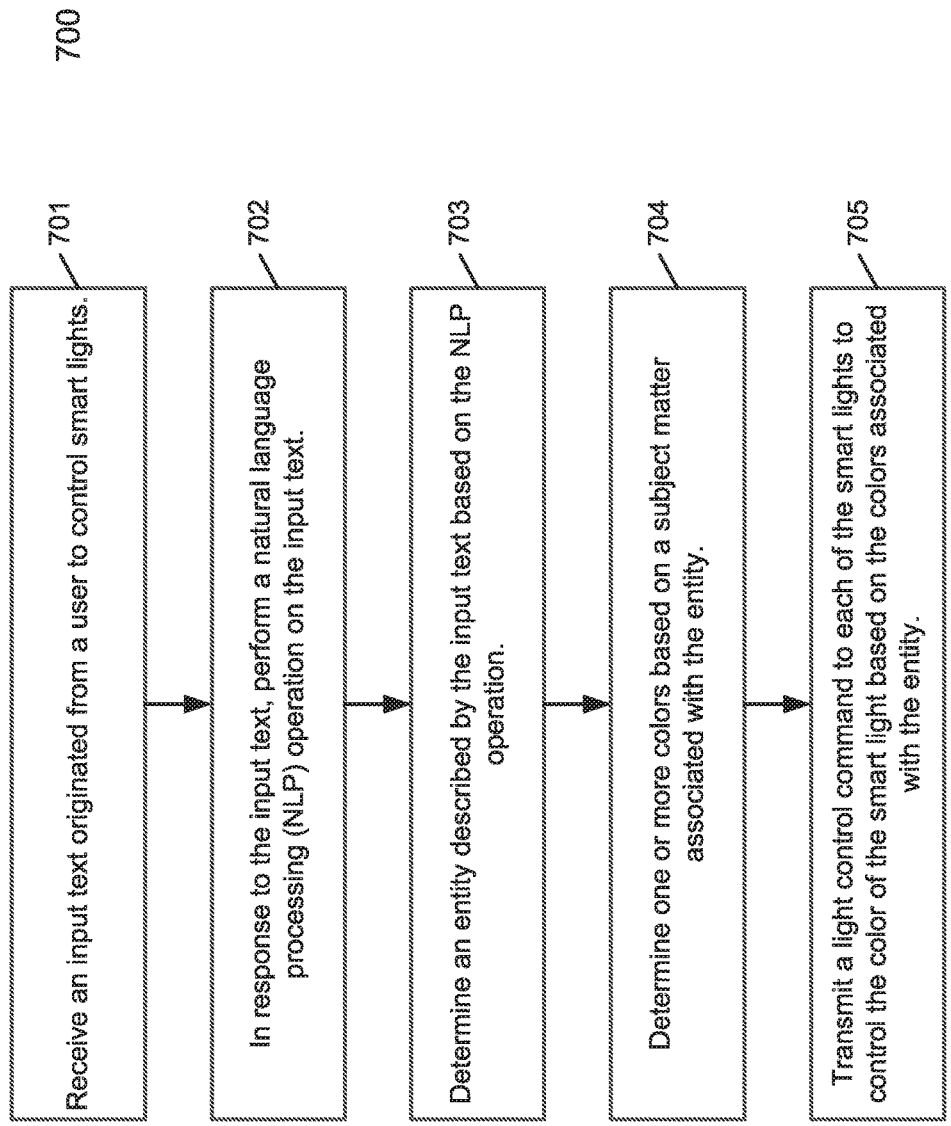
FIG. 7 is a flow diagram illustrating a process of configuring smart lights according to one embodiment.

FIG. 7 is a flow diagram illustrating a process of configuring colors of smart lights based on user intents according to one embodiment of the invention. Process 700 may be performed by processing logic which may include software, hardware, or a combination thereof. For example, process 700 may be performed by system 200 of FIG. 2. Referring to FIG. 7, in operation 701, processing logic receives an input text that was originated from a user. The input text may be received as a part of an email, texting, or via a chat application. Alternatively, the input text may be converted from a voice phrase or sentence spoken by the user or via a recorded audio stream. In operation 702, in response to the input text, processing logic performs an NLP operation on the input text. In operation 703, processing logic determine an object or entity described by the input text based on the NLP operation. The processing logic may determine the object or entity using an entity predictive model, which may be created using machine learning techniques.

In operation 704, processing logic determines one or more colors based on a subject matter associated with the object or entity. Processing logic may perform a lookup operation in a color database or mapping table based on the subject matter to locate an entry matching the subject matter and obtains the associated color(s). Processing logic may further parse the input text to detect any predetermined phrase indicating any light emitting pattern as described above. In operation 705, processing logic generates and transmits a light control command to the smart lights to configure the smart lights to emit with determined colors and emitting patterns.

Note that the system as described above is not limited to supporting a personal assistant style platform, but it is also applicable in other innovative ways. For instance, it may be used in marketing campaigns or big gatherings, where users can simply send short messages or tweet to the smart lights to control them. In these occasions, the light bulbs' companion application might not be accessible by everyone, nor can everyone speak to a voice-controlled device as it might be a noisy environment. Thus the light bulbs can be connected with a short message or email receiver, or any social media handle to be controlled by a remote user.

The system can also be used for educational purposes. For instance, parents can use the lights to teach children the notion of color. Conventional way of doing this is using a cell phone application to change the color of lights. But this can be time consuming, distractive, and inaccurate. Also, parents can later use the lights to teach children colors of objects. For instance, sky is blue and clown fish (e.g., "Nemo") is orange-like.

The system can also be used for communication purposes. For instance, people can encode messages with colors and deliver the message with colors. This can be done in a non-obvious way for secrete messages, or in an obvious way to deliver a well acknowledged message. The system can also be used as triggers for certain displays when detecting certain sounds or words. This can be used in advertising displays or can be used in illustrative demonstrations. For instance, the system can be used to encode people's product reviews with colors according to review polarity. Then it is very easy and illustrative to compare comments on different products.

Figure 8:
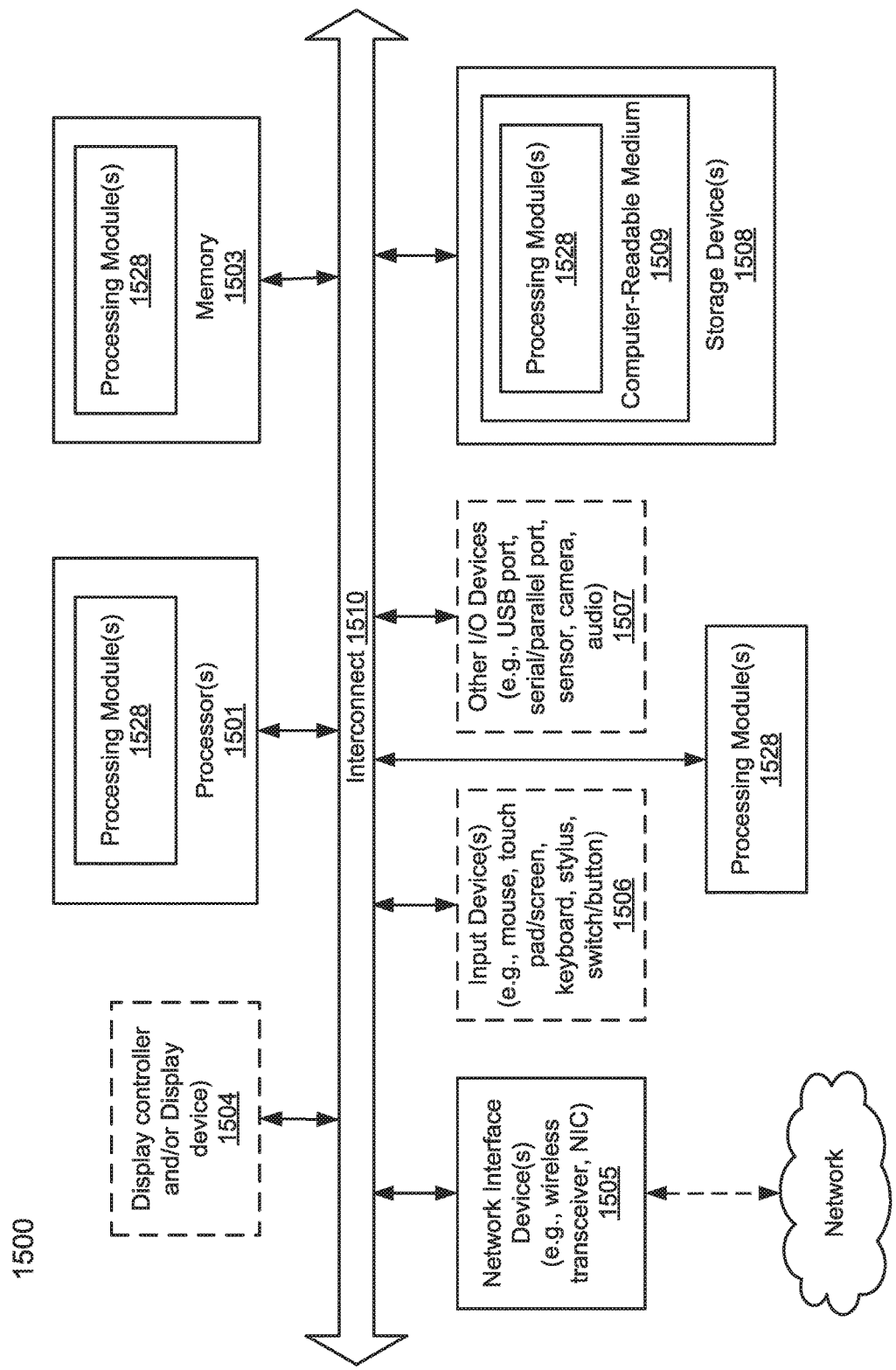
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above, such as, for example, a client device or a server described above, such as, for example, system 200 of FIG. 2, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows° operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, NLU system 110, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/ logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for controlling smart lights, the method comprising:

in response to a text stream in a text format originated from a user at an electronic device, performing a natural language processing (NLP) operation on the text stream;

determining an object described by the text stream based on the NLP processing operation and a machine-learning model;

determining one or more colors associated with the object by using a color database within the electronic device and if the one or more colors associated with the object cannot be determined using the color database:

transmitting an image search request to a remote image search server to search possible images concerning the object; and in response to an image received from the remote image search server, performing an image analysis on the image to determine the one or more colors from the image; and transmitting a light control command from the electronic device to each of a plurality of smart lights to control a color of each smart light based on the one or more colors associated with the object, such that the smart lights are lit with colors that are associated with the object.

2. The method of claim 1, further comprising:

receiving a voice stream having a voice command originated from the user; and performing a speech recognition on the voice stream to transcribe the voice stream to generate the text stream.

3. The method of claim 1, wherein determining one or more colors associated with the object comprises:

performing a search in a subject matter-to-color (subject matter/color) mapping table based on a subject matter associated with the object to locate a mapping entry matching the subject matter of the object; and obtaining the one or more colors from the matching entry of the subject matter/color mapping table.

4. The method of claim 3, wherein the subject matter/color mapping table includes a plurality of mapping entries, each mapping entry mapping a particular subject matter to one or more colors.

5. The method of claim 1, further comprising determining a light emitting pattern based on the NLP operation of the text stream, wherein the light control command further includes information indicating the light emitting pattern, such that the smart lights emit according to the light emitting pattern.

6. The method of claim 5, wherein determining a light emitting pattern comprises:

detecting a predetermined phrase from the text stream based on the NLP operation;

performing a lookup operation in a phrase-to-pattern (phrase/pattern) mapping table based on the predetermined phrase to locate a mapping entry matching the predetermined phrase; and obtaining the light emitting pattern from the matching entry.

7. The method of claim 6, wherein the phrase/pattern mapping table includes a plurality of mapping entries, each mapping entry mapping a particular phrase to a particular emitting pattern.

8. A non-transitory machine-readable medium having instructions stored therein, which when executed by a processor, cause the processor to perform operations, the operations comprising:

in response to a text stream in a text format originated from a user, performing a natural language processing (NLP) operation on the text stream;

determining an object described by the text stream based on the NLP processing operation and a machine-learning model;

determining one or more colors associated with the object by using a color database within the electronic device and if the one or more colors associated with the object cannot be determined using the color database:

transmitting an image search request to a remote image search server to search possible images concerning the object; and in response to an image received from the remote image search server, performing an image analysis on the image to determine the one or more colors from the image; and transmitting a light control command to each of a plurality of smart lights to control a color of each smart light based on the one or more colors associated with the object, such that the smart lights are lit with colors that are associated with the object.

9. The machine-readable medium of claim 8, wherein the operations further comprise:

receiving a voice stream having a voice command originated from the user; and performing a speech recognition on the voice stream to transcribe the voice stream to generate the text stream.

10. The machine-readable medium of claim 8, wherein determining one or more colors associated with the object comprises:

performing a search in a subject matter-to-color (subject matter/color) mapping table based on a subject matter associated with the object to locate a mapping entry matching the subject matter of the object; and obtaining the one or more colors from the matching entry of the subject matter/color mapping table.

11. The machine-readable medium of claim 10, wherein the subject matter/color mapping table includes a plurality of mapping entries, each mapping entry mapping a particular subject matter to one or more colors.

12. The machine-readable medium of claim 8, wherein the operations further comprise determining a light emitting pattern based on the NLP operation of the text stream, wherein the light control command further includes information indicating the light emitting pattern, such that the smart lights emit according to the light emitting pattern.

13. The machine-readable medium of claim 12, wherein determining a light emitting pattern comprises:

detecting a predetermined phrase from the text stream based on the NLP operation;

performing a lookup operation in a phrase-to-pattern (phrase/pattern) mapping table based on the predetermined phrase to locate a mapping entry matching the predetermined phrase; and obtaining the light emitting pattern from the matching entry.

14. The machine-readable medium of claim 13, wherein the phrase/pattern mapping table includes a plurality of mapping entries, each mapping entry mapping a particular phrase to a particular emitting pattern.

15. A data processing system, comprising:
a processor; and
a memory coupled to the processor to store instructions, which when executed by the processor, cause the processor to perform operations, the operations including in response to a text stream in a text format originated from a user, performing a natural language processing (NLP) operation on the text stream,
   determining an object described by the text stream based on the NLP processing operation and a machine-learning model,
   determining one or more colors associated with the object by using a color database within the electronic device and if the one or more colors associated with the object cannot be determined using the color database:
      transmitting an image search request to a remote image search server to search possible images concerning the object, and
      in response to an image received from the remote image search server, performing an image analysis on the image to determine the one or more colors from the image, and
   transmitting a light control command to each of a plurality of smart lights to control a color of each smart light based on the one or more colors associated with the object, such that the smart lights are lit with colors that are associated with the object.

16. The system of claim 15, wherein the operations further comprise:
   receiving a voice stream having a voice command originated from the user; and
   performing a speech recognition on the voice stream to transcribe the voice stream to generate the text stream.

17. The system of claim 15, wherein determining one or more colors associated with the object comprises:
   performing a search in a subject matter-to-color (subject matter/color) mapping table based on a subject matter associated with the object to locate a mapping entry matching the subject matter of the object; and
   obtaining the one or more colors from the matching entry of the subject matter/color mapping table.

18. The system of claim 17, wherein the subject matter/color mapping table includes a plurality of mapping entries, each mapping entry mapping a particular subject matter to one or more colors.

19. The system of claim 15, wherein the operations further comprise determining a light emitting pattern based on the NLP operation of the text stream, wherein the light control command further includes information indicating the light emitting pattern, such that the smart lights emit according to the light emitting pattern.

* * * * *